United States Patent [19]

Balz

[11] Patent Number: 4,959,645
[45] Date of Patent: Sep. 25, 1990

[54] REMOTELY ACTIVATED TELEVISION SWIVEL BASE

[76] Inventor: Richard C. Balz, 301 Heath St., Buffalo, N.Y. 14214

[21] Appl. No.: 289,560

[22] Filed: Dec. 23, 1988

[51] Int. Cl.$^5$ .............................................. H04Q 1/00
[52] U.S. Cl. ................................. 340/825.72; 312/7.2; 248/172; 248/920
[58] Field of Search .................... 340/825.69, 825.72, 340/825.76, 700, 727; 358/194.1, 248, 249, 254, 229, 100, 108; 341/176; 318/16; 455/352, 353, 354, 347, 603; 248/919, 920, 924, 122, 128, 129, 130, 132, 220.1; 312/7.2, 249, 252, 312, 253

[56] References Cited

U.S. PATENT DOCUMENTS

| | | | |
|---|---|---|---|
| 2,643,083 | 6/1953 | Troutman | 248/924 |
| 2,890,010 | 6/1959 | Barkheimer | 248/919 |
| 3,625,162 | 12/1971 | Crew | 248/172 |
| 3,813,491 | 9/1972 | Pennar | 358/254 |
| 3,906,369 | 9/1975 | Pitman et al. | 340/825.72 |
| 4,033,653 | 7/1977 | Doring et al. | 312/253 |
| 4,404,558 | 9/1983 | Yen . | |
| 4,482,947 | 11/1984 | Zato et al. | 358/194.1 |
| 4,499,464 | 2/1985 | Knox et al. . | |
| 4,616,218 | 10/1986 | Bailey et al. | 340/700 |
| 4,621,992 | 11/1986 | Angott . | |
| 4,712,104 | 12/1987 | Kobayashi . | |
| 4,728,949 | 3/1988 | Platte et al. . | |

FOREIGN PATENT DOCUMENTS

| | | | |
|---|---|---|---|
| 2835199 | 2/1980 | Fed. Rep. of Germany | 358/249 |
| 2356389 | 1/1978 | France | 312/7.2 |
| 0833353 | 4/1960 | United Kingdom | 312/7.2 |

*Primary Examiner*—Donald J. Yusko
*Assistant Examiner*—Edwin C. Holloway, III
*Attorney, Agent, or Firm*—Leon Gilden

[57] ABSTRACT

A remotely activated swivel base for use with a television set and the like is set forth wherein the base is remotely actuated by an infra-red transmitter to one of a first and second infra-red receiver to provide for rotative and vertical adjustment of the base relative to a support. Additionally, padded corner mounts are provided for securement of a television relative to the base wherein a plurality of brackets are associated with each corner support for vertical and dimensional adjustment of the television receiving unit relative to the base.

4 Claims, 4 Drawing Sheets

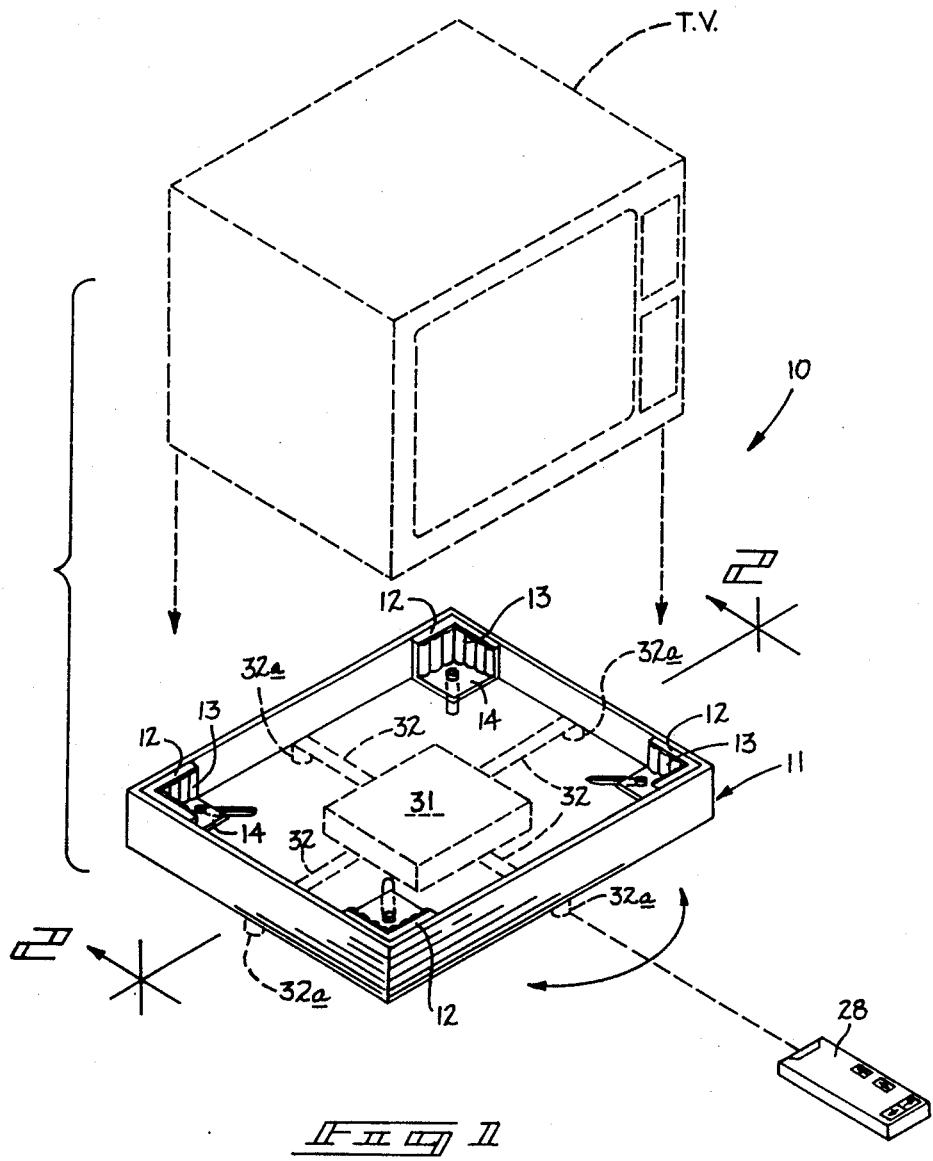

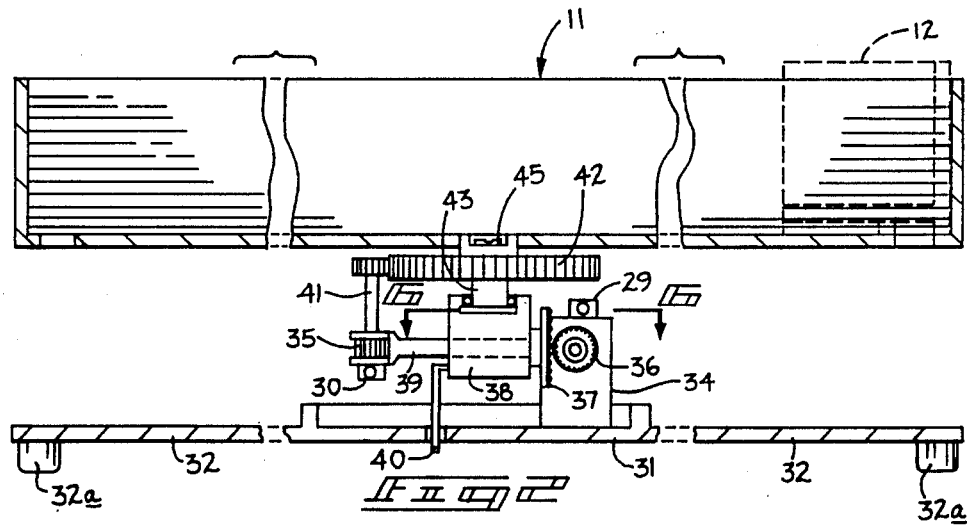
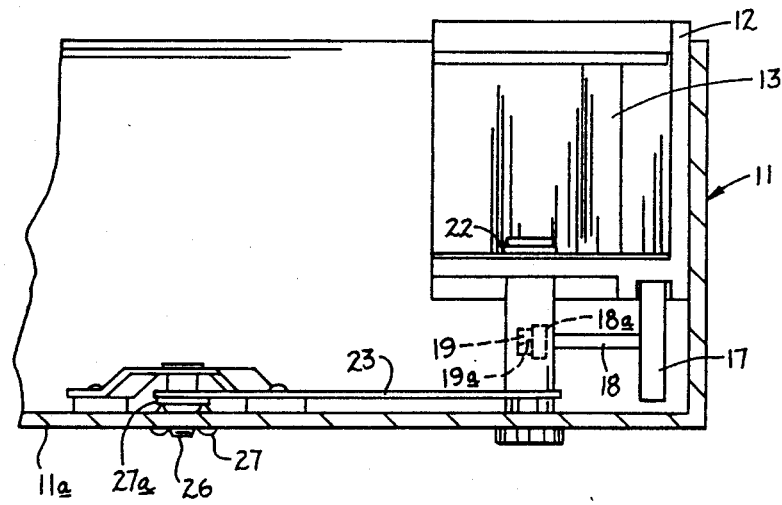

REMOTELY ACTIVATED TELEVISION SWIVEL BASE

BACKGROUND OF THE INVENTION

1. Field of the Invention

The field of invention relates to television support mounts, and more particularly pertains to a new and improved remotely actuatable television swivel base wherein the same may be mounted for vertical and pivotal adjustment relative to a viewer.

2. Description of the Prior Art

The use of remotely controlled apparatus for various purposes is known in the prior art. The prior devices have heretofore been of various organizations to control remotely mounted receivers in association with the apparatus for actuation of the apparatus in predetermined manners. Prior devices are exemplified in U.S. Pat. No. 4,728,949 to Platte wherein a remote control unit typical of a remotely positioned transmitter for association with a receiver and decoder to actuate various appliances.

U.S. Pat. No. 4,712,104 to Kobayashi sets forth a remote control unit for window blinds utilizing a signal receiver associated with a transmitter for controlling individual blinds as controlled by a remote operator.

U.S. Pat. No. 4,621,992 to Angott sets forth a ceiling fan and light assembly controlled by a remotely positioned transmitter for association with a receiver in association with the ceiling fan.

U.S. Pat. No. 4,499,464 to Knox, et al., sets forth a remotely operative fuel dispensing pump wherein a transmitter utilized by an attendant may reset a fuel pump for enabling dispensing of fuel to a customer.

U.S. Pat. No. 4,404,558 to Yen sets forth a garage door in association with a remotely positioned transmitter for associated opening and closing of the garage door in accordance with preset parameters.

As may be appreciated, the prior art has heretofore set forth patents for providing remote control transmissions in association with a receiver for actuation of various apparatus.

As such, it may be appreciated that there is a continuing need for a new and improved remotely actuated television base which addresses both the problems of convenience and effectiveness and in this respect, the present invention substantially fulfills this need.

SUMMARY OF THE INVENTION

In view of the foregoing disadvantages inherent in the known types of remotely actuated mechanisms now present in the prior art, the present invention provides a remotely activated television swivel base wherein the same may accommodate a variety of television units adjustably within the base and may further vertically and pivotally reposition the base relative to a user. As such, the general purpose of the present invention, which will be described subsequently in greater detail, is to provide a new and improved remotely activated television swivel base which has all the advantages of the prior art remotely actuated mechanisms and none of the disadvantages.

To attain this, the present invention comprises a remotely actuated television swivel base wherein a corner support is positioned on each corner of the base for vertical and diagonal adjustment of the corner brace relative to the base. Further, a plurality of receivers including a first and second receiving unit for pivotally and vertically adjusting the base relative to a transmission unit is set forth.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved remotely activated television swivel base which as all the advantages of the prior art remotely actuated mechanisms and none of the disadvantages.

It is another object of the present invention to provide a new and improved remotely activated swivel television base which may be easily and efficiently manufactured and marketed.

It is a further object of the present invention to provide a new and improved remotely activated swivel television base which is of a durable and reliable construction.

An even further object of the present invention is to provide a new and improved remotely activated swivel television base which is susceptible of a low cost of manufacture with regard &o both materials and labor, and which accordingly is then susceptible of low prices of sale to the consuming public, thereby making such remotely activated swivel television bases economically available to the buying public.

Still yet another object of the present invention is to provide a new and improved remotely activated swivel television base which provides in the apparatuses and methods of the prior art some of the advantages thereof, while simultaneously overcoming some of the disadvantages normally associated therewith.

Still another object of the present invention is to provide a new and improved remotely activated swivel television base wherein the same includes vertical and pivotal adjustment of the base relative to a viewer and further includes adjustment means at each corner of the base for accommodation of a variety of television sets therewithin.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic view taken along the lines 2—2 of FIG. 1 in the direction indicated by the arrows.

FIG. 3 is an orthographic view, somewhat enlarged, illustrating a cam actuated corner brace.

DESCRIPTION OF THE PREFERRED EMBODIMENT

Figure 4:
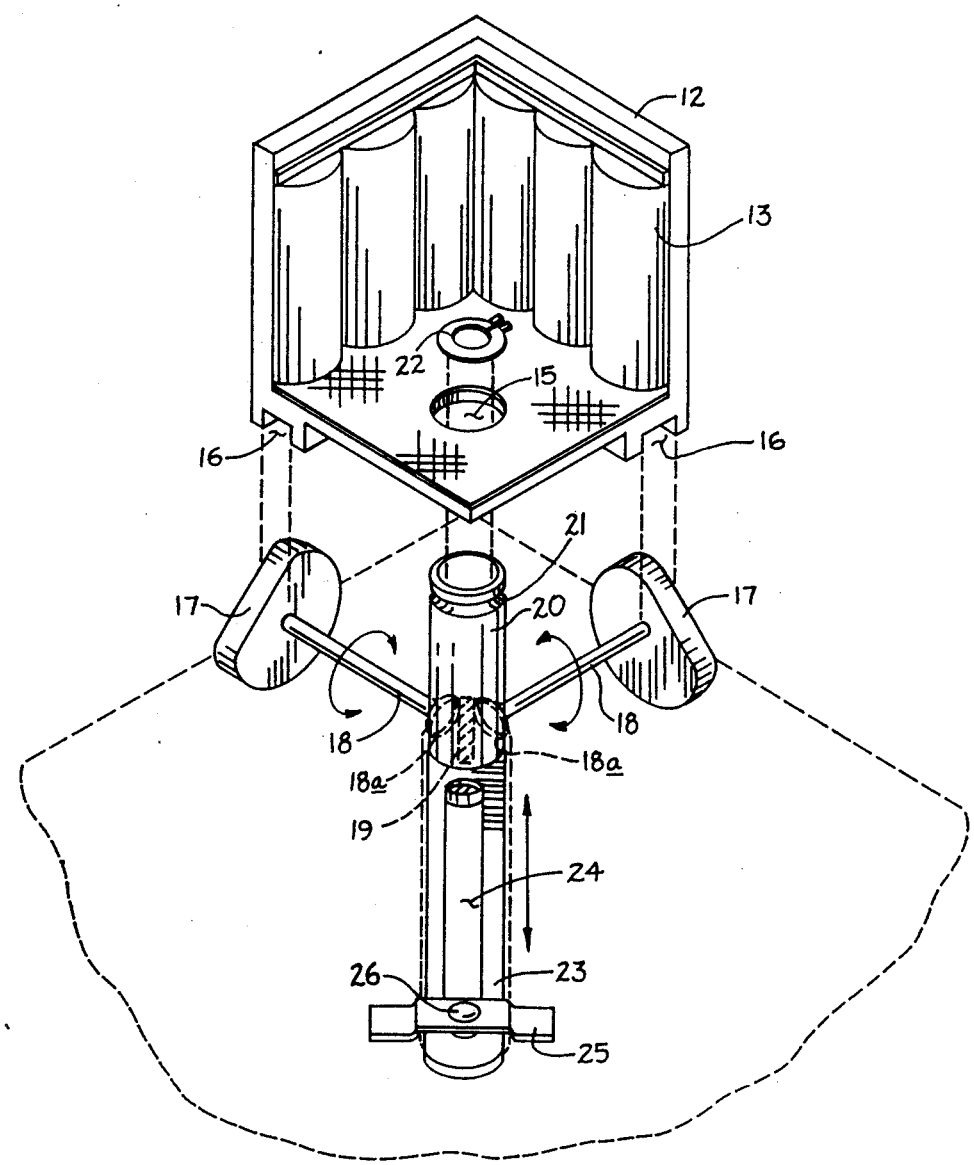
FIG. 4 is an isometric illustration, somewhat expanded, of a cam actuated corner brace.
Figure 5:
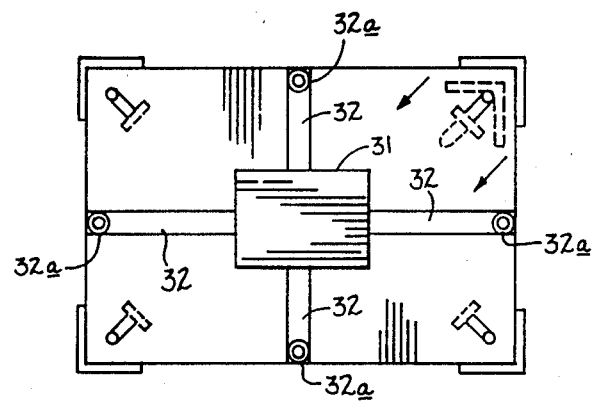
FIG. 5 is a top orthographic view of the base.
Figure 6:
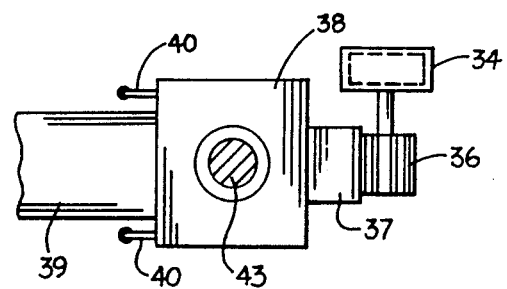
FIG. 6 is an orthographic view taken along the lines 6—6 of FIG. 2 in the direction indicated by the arrows.

With reference now to the drawings, and in particular to FIGS. 1 to 6 thereof, a new and improved remotely activated television swivel base embodying the principles and concepts of the present invention and generally designated by the reference numeral 10 will be described.

More specifically, it will be noted that the remotely activated television swivel base apparatus 10 essentially comprises a support base 11 including four diagonally adjustable corner brackets 12. The corner brackets 12 include a plurality of vertical walls defining an "L" shaped wall structure to complementarily fit within each corner of the rectangular support base 11. The corner brackets are positionable along the support floor 11a of the support base 10.

Each of the corner brackets 12 is formed with resilient padding 13 along the interior surfaces of the "L" shaped walls with a floor 14 integrally and orthogonally oriented to the "L" shaped vertical walls formed with an aperture 15 orthogonally therethrough. Underlying the floor in alignment with the vertical walls are a plurality of orthogonally joined channels 16 of a width approximately equal to that of a plurality of cooperative cams 17 rotatably adjustable through shaft 18 and gears 18a positioned within the hollow cylindrical boss 20. A worm gear 19 is rotatably mounted within the boss rotatable by means of a hexagonal recess 19a within the worm gear 19 to thereby rotatably adjust the cams 17 to vertically position the corner brackets 12. The cylindrical boss 20 is formed with a boss groove 21 accepting a snap ring 22 therearound to position the boss groove rotatably relative to the floor 14 of the corner brackets. A leg 23 extends orthogonally outwardly of the cylindrical boss 20 relative to the axis of the boss 20 overlying a support floor slot 24 with a flexible overlying bracket 25 integrally formed to the support floor 11a with a threaded shaft 26 extending downwardly therefrom fixedly secured to the flexible overlying bracket 25. A wing nut 27 to secure the leg 23 between the floor 11a and the bracket 25 is positioned underlying the floor 11a with a thrust washer 27a positioned between the wing nut and the underlying surface of the floor 11a. In this manner, loosening of the wing nut 27 allows diagonal adjustment of the brackets 12 along the slots 24 to accommodate varying dimensions of television receivers.

Infra-red transmitter 28 includes a plurality of transmission frequencies for reception by a respective first receiver 29 and a second receiver 30 positioned within a support case 31. The support case 31 includes a plurality of orthogonally oriented case braces 32 formed with friction feet 32a depending downwardly therefrom for engagement with a support surface. A first motor housing 34 fixedly secured to the support case 31 actuatable by the first receiver 29, and a second motor drive housing 35 actuatable by the second receiver 30 wherein the first and second motors within the motor drive housings include electric motors of conventional construction to enable selective rotation and counter-rotation of the associated output shafts of the drive motors. A driven pinion gear 36 extends orthogonally outwardly of the first motor drive housing 34 rotatably mounted therefrom cooperative with a vertical rack gear 37 for vertical reciprocation of the adjustment housing 38. The adjustment housing 38 includes a support arm 39 extending orthogonally outwardly therefrom parallel to the floor of the support case 31 for securement of the second motor drive housing 35 therefrom. A plurality of alignment pins 40 extend downwardly and orthogonally through complementary through-extending apertures within the floor of the support case 31 for maintaining alignment of the adjustment housing 38 relative to the support case 31. A drive gear 41 is rotatably mounted for actuation outwardly and upwardly of the second motor drive house 35 to cooperate with driven gear 42 fixedly secured to a shaft 43 rotatably mounted within a recess of the adjustment housing 38. The shaft 43 is fixedly secured to the medial center of the support floor 11a of support case 11 by use of a conventional connector 45.

Accordingly, the actuation of the drive pinion gear 36 effects vertical adjustment of the support brace 11 wherein actuation of the drive gear 41 through the second motor drive housing 35 effects rotation of the support brace 11.

The manner of usage and operation of the instant invention therefore should be apparent from the above description and accordingly no fur&her discussion relative to the manner of usage and operation shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention &o the exact construction and operation shown and described, and accordingly, all suitable modifications and equivalents may be resorted to, falling within the scope of the invention.

What is claimed as being new and desired to be protected by LETTERS PATENT of the United States is as follows:

1. A remotely actuated apparatus for effecting rotative and vertical adjustment of a television receiving unit comprising, operator-actuatable transmitting means for producing a plurality of output signals, and a first and second receiving means each arranged for receiving a predetermined signal from said plurality of output signals, and a rectangular television receiving support base including an adjustable corner bracket means positionable within each corner of the support base along a support floor of the support base, and first drive means responsive to said first receiving means for vertically adjusting the support base, and second drive means responsive to said second receiving means for rotatably adjusting said support base, and further including a support case underlying said support base wherein said support case includes a plurality of case braces extending outwardly of said support case, and wherein said first drive means includes a first motor drive housing fixedly secured to and extending upwardly of said support case, and an adjustment housing vertically adjustable relative to said first motor drive housing, and wherein said adjustment housing includes the second drive means secured thereto wherein said second drive means includes an output drive for cooperation with a driven gear wherein said driven gear is fixedly secured to the floor of said support base, and wherein said adjustment housing includes a plurality of alignment pins extending through complementarily shaped openings extending through a floor of said support case for alignment of said adjustment housing relative to said support case, and wherein said first motor drive housing includes a rotatable output pinion rotatably and drivingly mounted from said first motor drive housing for cooperation with a vertical rack fixedly secured to said adjustment housing for vertical positioning of said adjustment housing, and wherein said adjustable corner bracket includes a plurality of "L" shaped vertical walls with padding formed to an interior of said walls and a bracket floor extending orthogonally outwardly relative to said walls for receiving said television receiver.

2. A remotely actuated apparatus as set forth in claim 1 wherein said bracket floor includes a through-extending aperture for receiving a hollow cylindrical boss therethrough, and said cylindrical boss includes a plurality of cam members for vertically adjusting said corner bracket.

3. A remotely actuated apparatus as set forth in claim 1 wherein said cylindrical boss and each associated corner bracket is adjustably mounted along the floor of said support base diagonally of the floor of said support base within a slot underlying each corner bracket formed through each floor of said support base, and further including a leg extending orthogonally relative to an axis defining by said cylindrical boss cooperating with a flexible bracket overlying the leg to capture the leg between the bracket and the floor of the support base.

4. A remotely actuated apparatus as set forth in claim 3 wherein said cylindrical boss includes a rotatably mounted worm gear axially aligned with said cylindrical boss cooperating with output shaft to rotate the cams to vertically adjust each corner bracket.

* * * * *